No. 834,924. PATENTED NOV. 6, 1906.
A. H. MEECH.
ROPE CLAMP.
APPLICATION FILED NOV. 24, 1905.
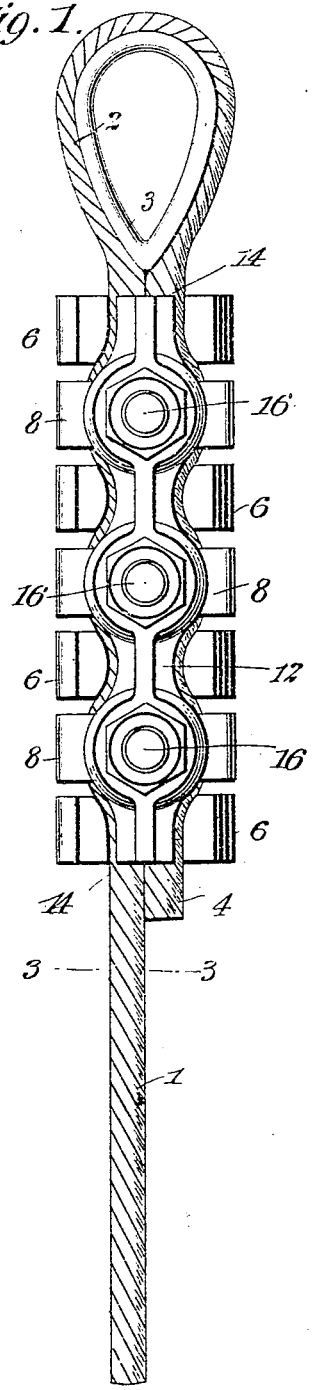
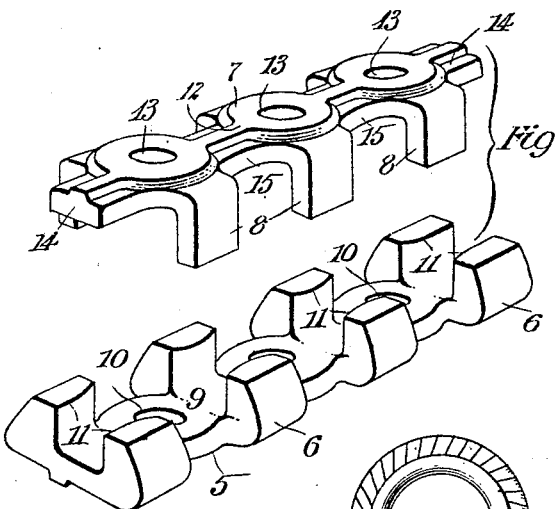
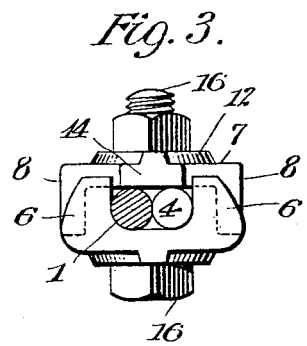
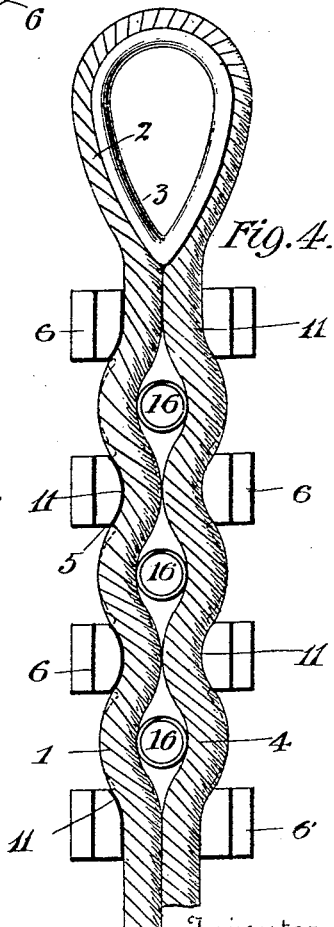
Witnesses
Inventor
Alfred H. Meech
By his Attorneys
Rosenbaum & Stockbridge

UNITED STATES PATENT OFFICE.

ALFRED H. MEECH, OF CHATHAM, NEW YORK.

ROPE-CLAMP.

No. 834,924.  Specification of Letters Patent.  Patented Nov. 6, 1906.

Application filed November 24, 1905. Serial No. 288,882.

*To all whom it may concern:*

Be it known that I, ALFRED H. MEECH, a citizen of the United States, residing at Chatham, in the county of Columbia and State of New York, have invented certain new and useful Improvements in Rope-Clamps, of which the following is a full, clear, and exact description.

My invention relates to rope-clamps.

Stranded steel-wire cables are now produced which have a remarkably high tensile strength amounting to two hundred and twenty-five thousand or two hundred and fifty thousand pounds per square inch of actual cross-section, and the loads which cables are now called upon to carry is also proportionately increased. It is therefore highly important that the means employed for fastening the cable-terminals or joining adjacent sections should be capable of withstanding the increased strains and be of the most certain and trustworthy character, withstanding the imposed stresses under all circumstances, regardless of corrosion, vibration, oxidation, or other deleterious influences.

It is the purpose of my present invention to provide a clamp applicable to securing the ends of a wire or rope cable or joining adjacent sections and which shall impose a greater resistance to failure than the breaking-point of the cable—in other words, one which shall insure against failure of the cable except at its calculated breaking-point.

A further object of the invention is to provide a device of this character which shall be simple, compact in appearance, and easy to construct.

With these and other objects in view my invention consists in the construction, combination, location, and arrangement of parts, all as will be more fully hereinafter set forth, as shown in the accompanying drawings, and finally particularly pointed out in the appended claims.

In the drawings, Figure 1 is a side view illustrating a cable having a clamp thereon embodying the principles of my invention. Fig. 2 is a perspective view showing the principal portions of the clamp. Fig. 3 is a sectional view on the line 3 3 of Fig. 1 looking upward. Fig. 4 is a view similar to Fig. 1 with one of the clamping-plates removed.

In carrying out my invention I make use of clamping plates or members, which are arranged to deflect the cable into a series of bights or bends of sufficient sharpness to preclude slipping, but of a nature which shall not injure the cable and weaken the same, especially adjacent to its main portion.

Referring now to the drawings, and to the various views and reference-signs appearing thereon, in which like parts are designated by the same reference-sign wherever they occur, 1 indicates a cable of stranded wire, hemp, or other form of flexible or semiflexible construction, and I have shown a clamp embodying the principles of my invention applied thereto for the purpose of producing an eye 2 at a terminal portion of the cable.

3 indicates the usual thimble, which serves to guide the eye into a proper form and prevent excessive wear thereon. The end 4 of the cable is brought parallel and adjacent to its main portion 1, so as to lie alongside the same, and upon the adjacent sections I place the clamps, which constitute the essential feature of my invention. While I have shown the clamps applied for the purpose of forming a terminal eye upon a single cable, it is evident that they may be applied to splice adjacent sections or for any other purpose.

In Fig. 2 is illustrated a pair of clamping members which I have found efficient in actual practice, comprising a main clamping member 5, having legs 6, and a supplemental clamping member 7, also having a plurality of legs 8, which are designed to interlock with the legs 6 of the part 5. The member 5 comprises a central longitudinal support or back 9 with a series of openings 10, and the legs 6 preferably lie in pairs at opposite sides of the support or back 9, so as to present opposed faces to one another, the arrangement being such as to leave a pair of legs at each end of the clamping-frame. In this way a plurality of pairs of opposed legs are produced, between which are located the spaced openings 10 in alternating or staggered relation therewith. The opposed faces of corresponding legs 6 are rounded slightly, as shown at 11, for a purpose which will later appear.

The clamping member 7 is somewhat similar in its general form to the clamping member 5, having a support or back 12 and spaced openings 13, which are similar to and capable of being alined with the openings 10 of the clamping member 5. The legs 8 of the member 7 do not, however, correspond to the legs 6 of the part 5, being opposite and in line with the openings 13 rather than in staggered relation thereto, as in the previous part. The arrangement is such as to leave a projecting part 14 at each end of the back or support 12 and intermediate narrow portions which correspond in number and location to the legs 6 of the opposite clamping member. In like manner the number and location of the legs 8 correspond substantially with the spaces between the legs 6 of the opposite clamping member. Under these circumstances it will be apparent that the two clamping members can be interlocked or dovetailed together, so that the legs 8 lie in the spaces between the legs 6, while the narrow parts 14 and 15 of the member 7 lie between the opposed faces of the legs 6 upon the member 5. In this position the openings 10 and 13 are all opposite one another.

Referring now particularly to Fig. 4, the member 5 is shown lying upon its back with its legs turned upward. The bolts 16 are inserted into place, and the cable 1 is threaded longitudinally along the clamping member 5 in a sinuous path around the various bolts and legs 6, and its end 4 is finally doubled backward, so as to be also included in sinuous form between the opposed legs. The clamping member 7 is now placed over the whole in such a way that the legs 8 will fall between the legs 6 of the lower clamping member, as above described. In this way they will come opposite the deflected portions of the cable-sections 1 and 4, and thereby protect the same against injury or undue expansion. Any form of bolts, screws, rivets, or connecting means 16 are now passed through the alined openings 10 and 13, after which the clamp is complete and the cable-sections secured together in permanent relation.

What I claim is—

1. A cable-clamp comprising a member having a series of pairs of legs in spaced transverse planes along the length thereof, means intermediate said pairs for deflecting the cable into a series of bights or bends, and a second clamping member also having legs and arranged to grip the cables in such relation.

2. A cable-clamp comprising a member having a series of pairs of legs in spaced transverse planes along the length thereof, bolts intermediate said pairs and adapted to lie between the cables to be clamped, and a second clamping member having pairs of legs opposite said bolts and spaced apart an amount to hold the cable to be clamped against said bolts.

3. A cable-clamp comprising a clamping member having a series of opposed legs and an opening, a second clamping member having an opening, and means passed through said openings for connecting said members and adapted to lie between the cables to be clamped and deflect the same into a series of bends.

4. A cable-clamp comprising a member having a back with spaced openings therein, legs projecting from said back and arranged in a series having opposite rounded faces, a second clamping member having a back with openings corresponding to those of the first-named member and a series of legs projecting therefrom and disposed opposite the spaces between the legs of the first-mentioned member, and means passed through said openings for connecting said members.

5. A cable-clamp comprising a member having a back with a plurality of openings therein, legs projecting between said openings and also at the terminal ends of the member, a second member having openings corresponding to those of the first-mentioned member and legs substantially in the same transverse plane of said last-named openings, and means passed through said openings of both members for connecting said members.

6. A cable-clamp comprising a member having a back with an opening therein, a pair of legs at each side of said opening having opposed rounded faces, a second member having an opening and a pair of legs substantially in the same transverse plane of said opening, and means passed through said openings of both members for connecting said members.

7. A cable-clamp comprising a member having a back with spaced openings therein, legs intermediate said openings, a second clamping member having openings, and means passed through said openings of both members to connect the members and deflect a cable into a plurality of bights or bends between said legs.

In witness whereof I subscribe my signature in the presence of two witnesses.

ALFRED H. MEECH.

Witnesses:
 WM. M. STOCKBRIDGE,
 WILLIAM DORMAN, Jr.